(12) United States Patent
Yamazoe (10) Patent No.: US 11,597,241 B2
(45) Date of Patent: Mar. 7, 2023

(54) PNEUMATIC TIRE (71) Applicant: SUMITOMO RUBBER INDUSTRIES, LTD., Hyogo (JP)

(72) Inventor: Shohei Yamazoe, Hyogo (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 162 days.

(21) Appl. No.: 16/601,788

(22) Filed: Oct. 15, 2019

(65) Prior Publication Data
US 2020/0130423 A1 Apr. 30, 2020

(30) Foreign Application Priority Data

Oct. 31, 2018 (JP) .............................. JP2018-204602

(51) Int. Cl.
B60C 13/00 (2006.01)
B60C 9/02 (2006.01)
(52) U.S. Cl.
CPC .......... B60C 13/003 (2013.01); B60C 9/0292 (2013.01)
(58) Field of Classification Search
CPC .............................. B60C 13/00; B60C 13/003
See application file for complete search history.

(56) References Cited

U.S. PATENT DOCUMENTS

| 3,399,257 | A | 8/1968 | Ueno | |
| 2006/0070691 | A1* | 4/2006 | Iio | B60C 9/20 |
| | | | | 152/526 |
| 2008/0271830 | A1* | 11/2008 | Suzuki | B60C 9/2009 |
| | | | | 152/527 |
| 2010/0300594 | A1* | 12/2010 | Mukai | B60C 13/001 |
| | | | | 152/523 |
| 2018/0104990 | A1* | 4/2018 | Kobayashi | B60C 9/263 |

FOREIGN PATENT DOCUMENTS

| EP | 1093940 | | 4/2001 |
| EP | 1106396 | | 6/2001 |
| EP | 3112189 | | 1/2017 |
| JP | 2007083604 A | * | 4/2007 |
| JP | 2018-30279 | | 3/2018 |

* cited by examiner

Primary Examiner — Cedrick S Williams
(74) Attorney, Agent, or Firm — Greenblum & Bernstein, P.L.C.

(57) ABSTRACT

In a pneumatic tire 2, a contour of an outer surface of each side portion includes a first segment that is a straight line or a circular arc, and a second segment that is a straight line or a circular arc and that is connected to an end of the first segment. The contour of the outer surface of the side portion bends outward with a connection point of the first segment and the second segment as a bending point. The first segment and the second segment are preferably straight lines.

15 Claims, 3 Drawing Sheets

PNEUMATIC TIRE

This application claims priority on Patent Application No. 2018-204602 filed in JAPAN on Oct. 31, 2018. The entire contents of this Japanese Patent Application are hereby incorporated by reference.

BACKGROUND OF THE INVENTION

Field of the Invention

The present invention relates to pneumatic tires.

Description of the Related Art

In production of a tire, the outer surface of a raw cover is pressed against the cavity surface of a mold. At this time, bareness can occur on the tire when air present between the raw cover and the cavity surface or air remaining in the raw cover is not sufficiently discharged. Bareness that has occurred at a side portion of the tire is noticeable. To maintain high appearance quality of the tire, suppression of occurrence of bareness at the side portion is important.

To suppress occurrence of bareness, there is a method of increasing the thickness of a rubber of a tire. In this method, by increasing the amount of a rubber of a raw cover, the rubber is caused to spread over the entirety of the cavity surface. Accordingly, remaining of air is suppressed.

To suppress occurrence of bareness, there is a method of providing vent holes, saw cuts, or vent pieces to a mold. Air between a raw cover and the cavity surface is discharged through the vent holes, the saw cuts, or the vent pieces. JP2018-30279 reports studies for a mold with which remaining of air is suppressed.

When the thickness of a rubber of a tire is increased, the weight of the tire increases. In addition, this can cause unevenness in thickness. With the method of providing vent holes, saw cuts, or vent pieces to a mold, there is a problem of effectively discharging air remaining at a location away from the locations where the vent holes, the saw cuts, or the vent pieces are provided.

An object of the present invention is to provide a pneumatic tire in which occurrence of bareness at a side portion is suppressed without increasing the thickness of a rubber.

SUMMARY OF THE INVENTION

In a pneumatic tire according to the present invention, a contour of an outer surface of each side portion includes a first segment that is a straight line or a circular arc, and a second segment that is a straight line or a circular arc and that is connected to an end of the first segment. The contour of the outer surface of the side portion bends outward with a connection point of the first segment and the second segment as a bending point.

In the pneumatic tire according to the present invention, the contour of the outer surface of the side portion bends outward with the connection point of the first segment and the second segment as a bending point.

In a mold for producing the tire, a contour of a cavity surface that is brought into contact with the outer surface of the side portion bends inward so as to correspond to the shape of the outer surface of the side portion. Air between the cavity surface and the raw cover is likely to gather at the portion that bends inward. In the tire, at the side portion, portions where air is likely to remain are predictable. By providing a vent hole, a saw cut, a vent piece, or the like at the bending portion of the mold, remaining of air can be effectively prevented. In the tire, occurrence of bareness at the side portion can be suppressed. In the tire, to suppress occurrence of bareness, it is not necessary to increase the thickness of a rubber of the tire. In the tire, occurrence of bareness at the side portion is suppressed without increasing the thickness of the rubber.

Preferably, the first segment and the second segment are straight lines.

Preferably, the contour includes 2 to 15 bending points. Preferably, the number of the bending points is not greater than 4.

Preferably, a distance in a radial direction between the bending points that are adjacent to each other is not greater than 0.2 times a cross-sectional height of the tire.

Preferably, the contour includes a projection at the bending point.

Preferably, the bending point located at an outermost side is located outward of a maximum width position of the tire in a radial direction.

When the tire further includes a carcass and a pair of beads, the carcass includes a carcass ply extending on and between both beads, and the carcass ply is turned up around each bead from an inner side toward an outer side to form a main portion and a turned-up portion in the carcass ply, at least one of the bending points is preferably located near an end of the turned-up portion in a radial direction.

When the tire is a tire, for a two-wheeled vehicle, including a tread, at least one of the bending points is preferably located near a base of the tread and inward of the base in a radial direction.

A mold for a pneumatic tire according to the present invention has a side cavity surface that is brought into contact with an outer surface of a side portion of a raw cover. A contour of the side cavity surface includes a first segment that is a straight line or a circular arc, and a second segment that is a straight line or a circular arc and that is continuous with the first segment. The contour of the side cavity surface bends inward with a connection point of the first segment and the second segment as a bending point. An opening of a hole or a groove for discharging air remaining between the raw cover and the side cavity surface is provided at a position of the bending point on the side cavity surface.

Preferably, the first segment and the second segment of the mold are straight lines.

DESCRIPTION OF THE PREFERRED EMBODIMENTS

The following will describe in detail the present invention based on preferred embodiments with appropriate reference to the drawings.

Figure 1:
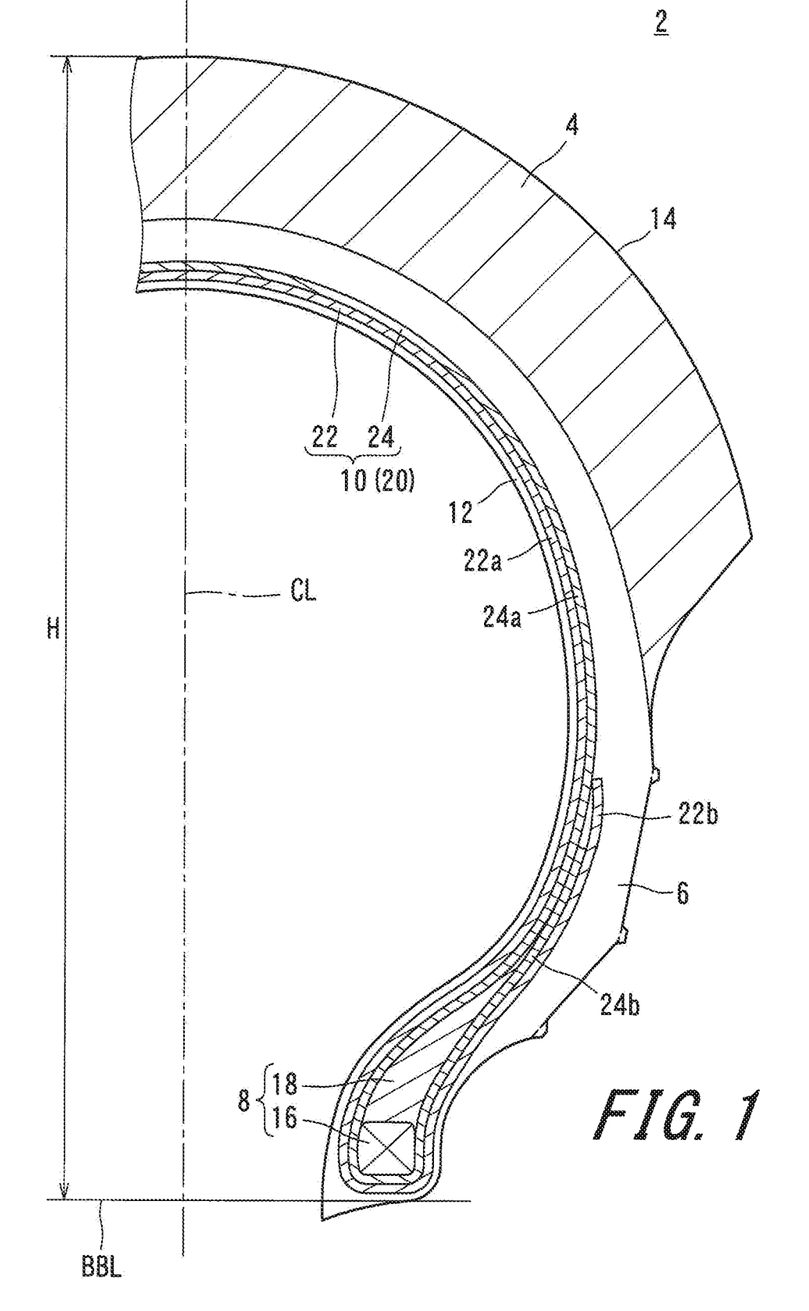
FIG. 1 is a cross-sectional view of a pneumatic tire according to an embodiment of the present invention.

FIG. 1 shows a pneumatic tire 2. In FIG. 1, the up-down direction is the radial direction of the tire 2, the right-left direction is the axial direction of the tire 2, and the direction perpendicular to the surface of the sheet is the circumferential direction of the tire 2. In FIG. 1, an alternate long and short dash line CL represents the equator plane of the tire 2.

The shape of the tire 2 is symmetrical about the equator plane except for a tread pattern. In FIG. 1, a solid line BBL is a bead base line. The bead base line BBL extends in the axial direction.

The tire 2 includes a tread 4, a pair of sidewalls 6, a pair of beads 8, a carcass 10, and an inner liner 12. Although not shown in FIG. 1, the tire 2 further includes a pair of chafers and a band. The tire 2 is of a tubeless type. The tire 2 is mounted to a two-wheeled vehicle.

The tread 4 has a shape that is convex outward in the radial direction. The tread 4 forms a tread surface 14 that is brought into contact with a road surface. Although not shown, grooves are formed on the tread 4. The tread pattern is formed by the grooves. The tread 4 is formed from a crosslinked rubber. For the crosslinked rubber of the tread 4, wear resistance, heat resistance, and grip performance are taken into consideration.

Each sidewall 6 extends from an edge of the tread 4 substantially inward in the radial direction. The sidewall 6 is formed from a crosslinked rubber that has excellent cut resistance and weather resistance. The sidewall 6 prevents the carcass 10 from being damaged.

Each bead 8 is located inward of the sidewall 6 in the radial direction. The bead 8 includes a core 16 and an apex 18. The core 16 has a ring shape and includes a non-stretchable wound wire. A typical material of the wire is steel. The apex 18 extends from the core 16 outward in the radial direction. The apex 18 is tapered outward in the radial direction. The apex 18 is formed from a highly hard crosslinked rubber.

The carcass 10 includes a carcass ply 20. In this embodiment, the carcass 10 includes two carcass plies 20, that is, a first ply 22 and a second ply 24. The first ply 22 and the second ply 24 extend on and between the beads 8 at both sides along the tread 4 and the sidewalls 6. The first ply 22 is turned up around each core 16 from the inner side toward the outer side. Because of this turning-up, a main portion 22a and turned-up portions 22b are formed in the first ply 22. The second ply 24 is turned up around each core 16 from the inner side toward the outer side. Because of this turning-up, a main portion 24a and turned-up portions 24b are formed in the second ply 24. An end of each turned-up portion 22b of the first ply 22 is located outward of an end of the turned-up portion 24b of the second ply 24 in the radial direction.

Each of the first ply 22 and the second ply 24 includes a large number of cords aligned with each other, and a topping rubber, which are not shown. The absolute value of the angle of each cord relative to the equator *plane* is 75° to 90°. In other words, the carcass 10 has a radial structure. The cords are formed from an organic fiber. Examples of preferable organic fibers include polyester fibers, nylon fibers, rayon fibers, polyethylene naphthalate fibers, and aramid fibers. The carcass 10 may be formed from a single ply.

The inner liner 12 is located inward of the carcass 10. The inner liner 12 is joined to the inner surface of the carcass 10. The inner liner 12 is formed from a crosslinked rubber that has an excellent air blocking property. A typical base rubber of the inner liner 12 is an isobutylene-isoprene-rubber or a halogenated isobutylene-isoprene-rubber. The inner liner 12 maintains the internal pressure of the tire 2.

Figure 2:
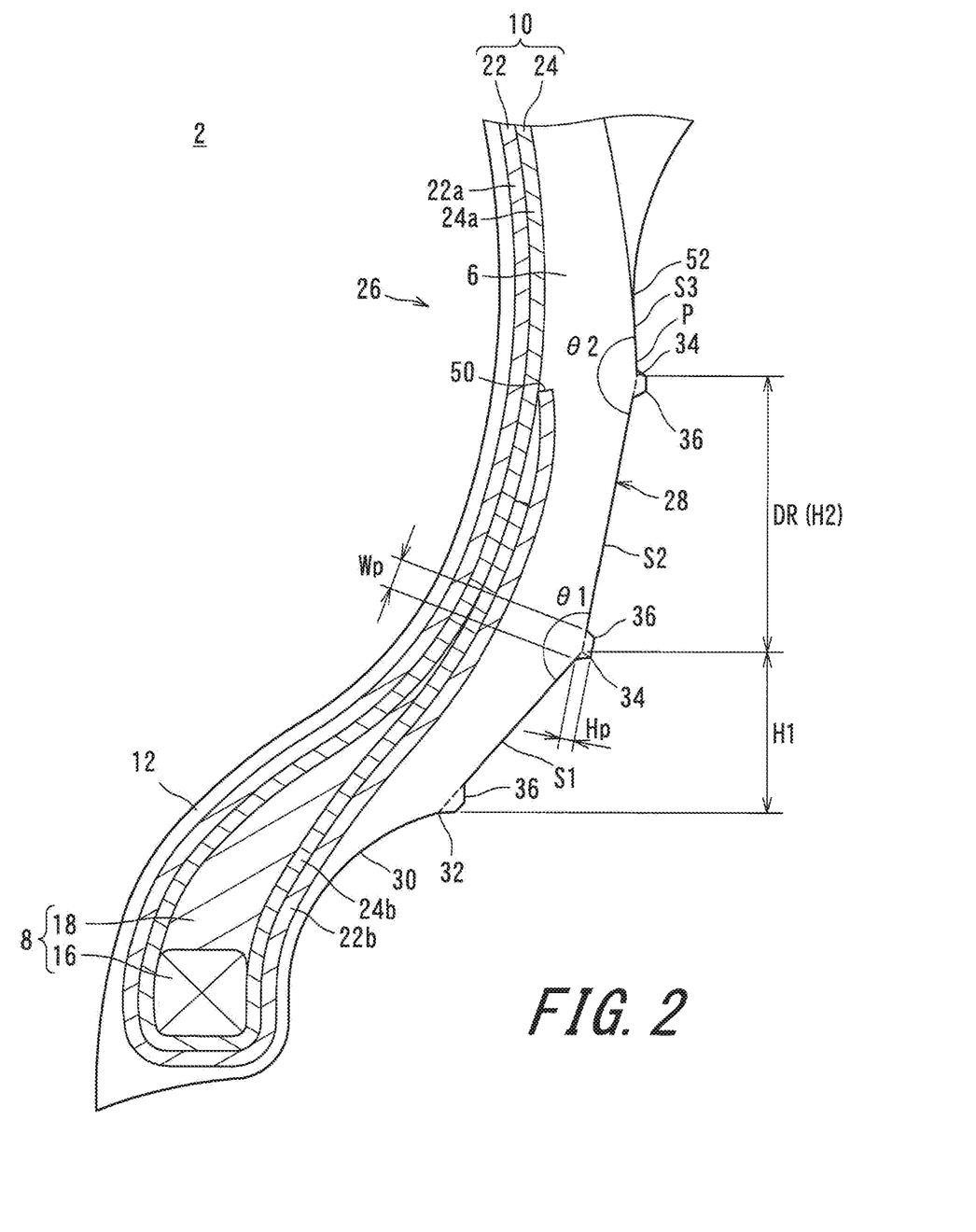
FIG. 2 is an enlarged cross-sectional view of a side portion in FIG. 1.

FIG. 2 shows a side portion 26 of the tire 2 in FIG. 1 in an enlarged manner. The tire 2 includes a pair of side portions 26. FIG. 2 shows one of these side portions 26. The outer surface of the side portion 26 is referred to as a side surface 28. In this specification, the radially outer end of the side surface 28 is an end of the tread surface 14. As shown in FIG. 2, the contour of the outer surface of a bead 8 portion includes a circular arc 30 that is convex inward in the axial direction and that is brought into contact with a flange of a rim. In this specification, the radially inner end of the side surface 28 is a radially outer end 32 of the circular arc 30.

As shown in FIG. 2, the contour of the side surface 28 includes a straight line and a circular arc. In this specification, the straight line and the circular arc that form the contour of the side surface 28 are each referred to as a segment. The contour of the side surface 28 includes a plurality of segments.

In the embodiment in FIG. 2, the contour of the side surface 28 includes straight lines S1 and S2. The contour of the side surface 28 includes two straight lines. The straight line S1 and the straight line S2 are continuous with each other. The straight line S2 is tilted relative to the straight line S1. That is, at this position, the contour of the side surface 28 bends. The contour of the side surface 28 bends outward with a connection point of these straight lines as a bending point. In this specification, the angle formed by the straight line S1 and the straight line S2 is referred to as a bending angle. In FIG. 2, reference character θ1 represents this bending angle. As shown in FIG. 2, the bending angle θ1 is measured at an inner portion of the side portion 26.

Two straight lines may be connected to each other via a small circular arc. In this case as well, these straight lines are defined to be "continuous with each other". Specifically, when the radius of curvature of a circular arc that is present between the two straight lines is not greater than 1 mm, these two straight lines are defined to be continuous with each other. In this case, a connection point of the two straight lines is defined on the assumption that this circular arc is not present.

As shown in FIG. 2, the contour of the side surface 28 includes a circular arc S3 (which is an illustrative example of a third segment). The straight line S2 and the circular arc S3 are continuous with each other. The straight line S2 and the circular arc S3 are not tangent to each other. At a connection point of the straight line S2 and the circular arc S3, a tangent line that is tangent to the circular arc S3 is tilted relative to the straight line S2. That is, at this position, the contour of the side surface 28 bends. The contour of the side surface 28 bends outward with the connection point of the straight line S2 and the circular arc S3 as a bending point. The bending angle in this case is the angle formed by the straight line S2 and the tangent line that is tangent to the circular arc S3. In FIG. 2, reference character θ2 represents this bending angle.

Although not shown, the contour of the side surface 28 may bend outward with a connection point of two continuous circular arcs as a bending point. That is, at the connection point of these circular arcs, these circular arcs are not tangent to each other. At the connection point of these circular arcs, a tangent line that is tangent to one of the circular arcs is titled relative to a tangent line that is tangent to the other circular arc. The bending angle in this case is the angle formed by the tangent lines that are tangent to these circular arcs.

In this specification, when two continuous segments bend outward with a connection point thereof as a bending point on the side surface 28, this bending point is referred to as an "outward bending point". In the embodiment in FIG. 2, two outward bending points 34 (a lower one of the bending points 34 being an illustrative example of a first bending point, and an upper one of the bending points 34 being an illustrative example of a second bending point) are present on the contour of the side surface 28.

As shown in FIG. 2, the contour of the side surface 28 includes a projection 36 at each outward bending point 34. At each outward bending point 34, the projection 36 is located at the outer side of an end of one of the two continuous segments, or at the outer sides of the two continuous segments and on both of the two continuous segments. The projection 36 extends in the circumferential direction. In this embodiment, the contour of the side surface 28 also includes a projection 36 at the radially inner end of the side surface 28.

Figure 3:
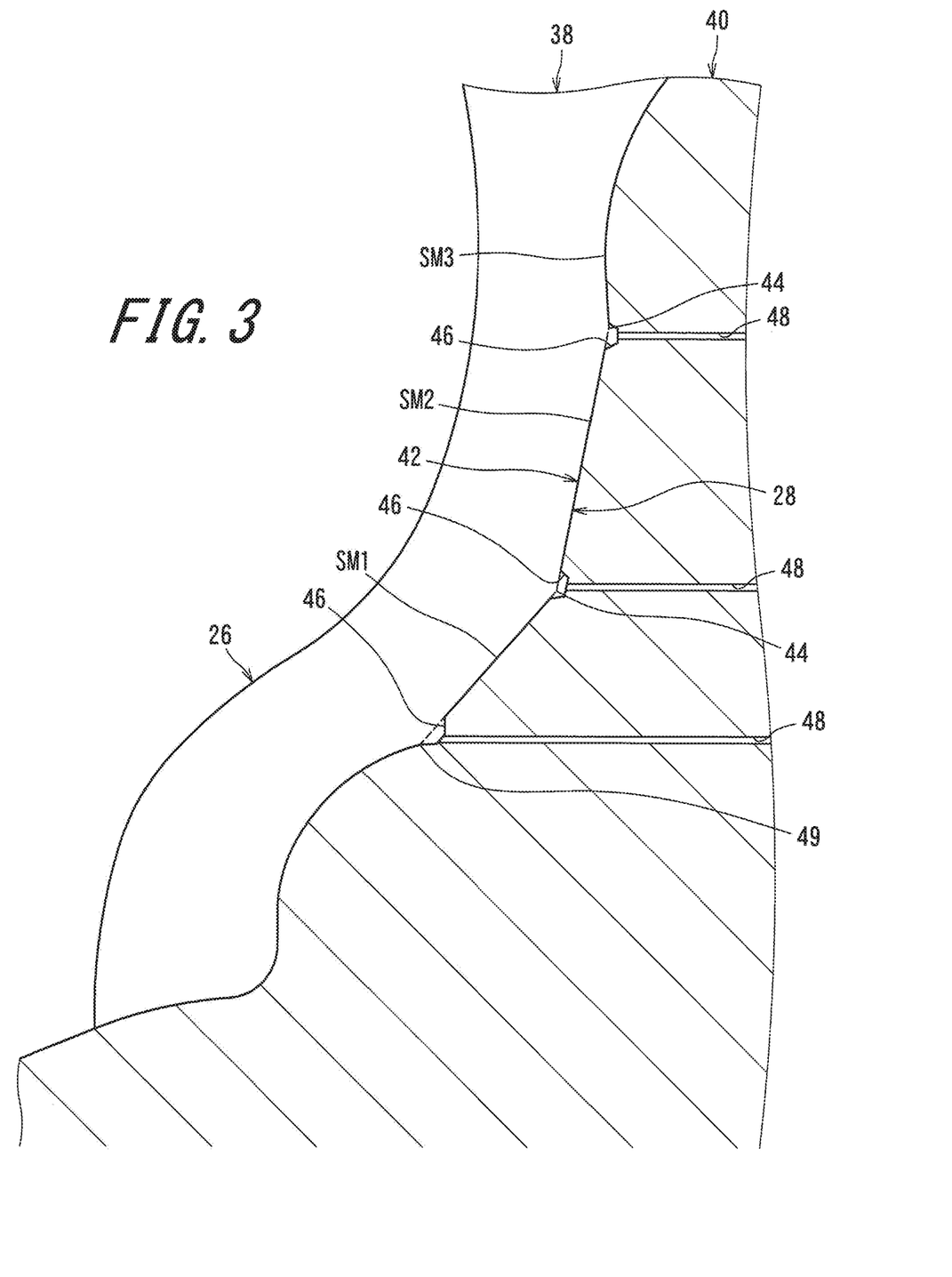
FIG. 3 is a cross-sectional view showing a state where the side portion in FIG. 2 is put in a mold.

In production of the tire 2, components such as the carcass 10, the beads 8, the sidewalls 6, and the like are combined with each other around a drum or a rigid core to form a raw cover. The raw cover is put into a mold. FIG. 3 shows the side portion 26 of a raw cover 38 put in a mold 40. In this drawing, as for the side portion 26, only the contour thereof is shown. The outer surface of the raw cover 38 is pressed against the cavity surface of the mold 40. The surface of the mold 40 with which the side surface 28 of the raw cover 38 comes into contact is referred to as a side cavity surface 42.

As shown in FIG. 3, the contour of the side cavity surface 42 includes a straight line and a circular arc so as to correspond to the contour of the side surface 28.

The straight line and the circular arc that form the contour of the side cavity surface 42 are each referred to as a segment. The contour of the side cavity surface 42 includes a plurality of segments.

In the embodiment in FIG. 3, the contour of the side cavity surface 42 includes straight lines SM1 and SM2 corresponding to the straight lines S1 and S2 which form the contour of the side surface 28. The straight line SM1 and the straight line SM2 are continuous with each other. The contour of the side cavity surface 42 bends inward with a connection point of these straight lines as a bending point.

As shown in FIG. 3, the contour of the side cavity surface 42 includes a circular arc SM3 corresponding to the circular arc S3 which forms the contour of the side surface 28. The straight line SM2 and the circular arc SM3 are continuous with each other. The straight line SM2 and the circular arc SM3 are not tangent to each other. The contour of the side cavity surface 42 bends inward with a connection point of the straight line SM2 and the circular arc SM3 as a bending point.

Although not shown, the contour of the side cavity surface 42 may bend inward with a connection point of two continuous circular arcs as a bending point.

In this specification, when two continuous segments bend inward with a connection point thereof as a bending point on the side cavity surface 42, this bending point is referred to as an "inward bending point 44". In the embodiment in FIG. 3, two inward bending points 44 are present on the contour of the side cavity surface 42.

As shown in FIG. 3, the contour of the side cavity surface 42 includes a recessed portion 46 at each inward bending point 44. At each inward bending point 44, the recessed portion 46 is located at the inner side of an end of one of the two continuous segments, or at the inner sides of the two continuous segments and on both of the two continuous segments. The recessed portion 46 extends in the circumferential direction. The recessed portion 46 corresponds to the projection 36 at the outward bending point 34 of the side surface 28. In this embodiment, the contour of the side cavity surface 42 also includes a recessed portion 46 at a radially inner end 49 of the side cavity surface 42.

As shown in FIG. 3, the mold 40 has a hole 48 (vent hole 48) for discharging air remaining between the raw cover 38 and the side cavity surface 42. In the mold 40, a plurality of vent holes 48 are present. Each vent hole 48 has an opening provided at the position of the inward bending point 44 of the side cavity surface 42. Instead of the vent hole 48, a groove (saw cut) or an opening of a hole of a vent piece for discharging air may be provided at the position of each inward bending point 44.

The following will describe advantageous effects of the present invention.

In the pneumatic tire 2 according to the present invention, the contour of the outer surface of the side portion 26 bends outward with the connection point of the straight line S1 and the straight line S2 and the connection point of the straight line S2 and the circular arc S3 as bending points. The contour of the side cavity surface 42 of the mold 40 for producing the tire 2 bends inward with the connection point of the straight line SM1 and the straight line SM2 and the connection point of the straight line SM2 and the circular arc SM3 as bending points so as to correspond to these bending points. Air between the cavity surface and the raw cover 38 is likely to gather in portions at the inward bending points 44. In the tire 2, at the side portion 26, portions where air is likely to remain are predictable. By providing the vent hole 48, a saw cut, a vent piece, or the like at the position of each inward bending point 44 of the mold 40, remaining of air can be effectively prevented. In the tire 2, occurrence of bareness at the side portion 26 can be suppressed.

In the tire 2, to suppress occurrence of bareness at the side portion 26, it is not necessary to increase the thickness of the rubber of the tire 2. In the tire 2, occurrence of bareness at the side portion 26 is suppressed without increasing the thickness of the rubber.

In FIG. 1, a double-headed arrow H represents the cross-sectional height of the tire 2. In FIG. 2, a double-headed arrow DR represents the interval in the radial direction between the adjacent outward bending points 34. The distance DR is preferably not greater than 0.2 times the cross-sectional height H. When the distance DR is set as described above, the distance between the bending points is not excessively large. Air between the side surface 28 and the side cavity surface 42 can effectively gather at the positions of the inward bending points 44 corresponding to these outward bending points 34. By providing the vent hole 48, a saw cut, or the like at the position of each of these inward bending points 44, air can be effectively discharged. In addition, because of such a configuration, the side portion 26 can bend flexibly. With the tire 2, good ride comfort is maintained. Furthermore, since the side portion 26 flexibly bends, concentration of distortion at the side portion 26 is suppressed. This contributes to the durability of the tire 2. The tire 2 maintains good durability.

In FIG. 2, a double-headed arrow H1 represents the height in the radial direction of the straight line S1. A double-headed arrow H2 represents the height in the radial direction of the straight line S2. In the tire 2, the height in the radial direction of each straight line is preferably not greater than 0.2 times the cross-sectional height H. That is, a ratio (H1/H) and a ratio (H2/H) are each preferably not greater than 0.2. When these ratios are set as described above, the side portion 26 can bend flexibly. With the tire 2, good ride comfort is maintained.

Moreover, since the side portion 26 flexibly bends, concentration of distortion at the side portion 26 is suppressed. This contributes to the durability of the tire 2. The tire 2 maintains good durability.

The number of outward bending points 34 is preferably not less than 2. When the number of outward bending points 34 is set to be not less than 2, the distance between the outward bending points 34 is not excessively large. Air between the side surface 28 and the side cavity surface 42 can effectively gather at the positions of the inward bending points 44 corresponding to these outward bending points 34. By providing the vent hole 48, a saw cut, a vent piece, or the like at the position of each of these inward bending points 44, air can be effectively discharged. From this viewpoint, the number of outward bending points 34 is more preferably not less than 3.

When the bending angle θ at each outward bending point 34 of the side surface 28 is smaller with respect to 180°, air between the side surface 28 and the side cavity surface 42 more effectively gathers at the position of the inward bending point 44 corresponding to the outward bending point 34. If the number of outward bending points 34 is excessively large, the shape of the side surface 28 is close to a circular arc as a whole. That is, the bending angle θ is close to 180°.

The number of outward bending points 34 is preferably not greater than 15. When the number of outward bending points 34 is set to be not greater than 15, the bending angle θ at each outward bending point 34 can be reduced to such an extent as to be sufficient to allow air to effectively gather. By providing the vent hole 48, a saw cut, a vent piece, or the like at the position of the inward bending point 44 corresponding to the outward bending point 34, remaining of air can be effectively prevented. In the tire 2, occurrence of bareness at the side portion 26 can be suppressed.

The bending angle θ at each outward bending point 34 is preferably not greater than 175°. When the bending angle θ is set to be not greater than 175°, air can effectively gather at the position of the inward bending point 44 corresponding to the outward bending point 34. By providing the vent hole 48, a saw cut, a vent piece, or the like at the position of the inward bending point 44, remaining of air can be effectively prevented. In the tire 2, occurrence of bareness at the side portion 26 can be suppressed. From this viewpoint, the bending angle θ is preferably not greater than 170° and further preferably not greater than 165°.

The contour of the side surface 28 preferably includes the projection 36 at each outward bending point 34 as described above. The contour of the side cavity surface 42 includes the recessed portion 46 corresponding to the projection 36, at the corresponding inward bending point 44. Air can more effectively gather in the recessed portion 46. By providing the vent hole 48, a saw cut, a vent piece, or the like at the position of the recessed portion 46, remaining of air can be effectively prevented. In the tire 2, occurrence of bareness at the side portion 26 can be suppressed.

In FIG. 2, a double-headed arrow Hp represents the height of the projection 36. The height Hp is the maximum value of the distance, between the segment on which the projection 36 is provided and the upper end of the projection 36 (the end opposite to the segment), measured in the direction of a line normal to the segment. The height Hp is preferably not greater than 1.0 mm. The projection 36 having a height Hp of not greater than 1.0 mm has reduced influence on the appearance. The tire 2 maintains excellent appearance. From this viewpoint, the height Hp is more preferably not greater than 0.8 mm. The height Hp is preferably not less than 0.5 mm. Air can more effectively gather in the recessed portion 46, of the side cavity surface 42, corresponding to the projection 36 having a height Hp of not less than 0.5 mm. By providing the vent hole 48, a saw cut, a vent piece, or the like at the position of the recessed portion 46, remaining of air can be effectively prevented. In the tire 2, occurrence of bareness at the side portion 26 can be suppressed. From this viewpoint, the height Hp is more preferably not less than 0.6 mm.

In FIG. 2, a double-headed arrow Wp represents the width of the projection 36. The width Wp is the width of the projection 36, at the base of the projection 36, measured along the segment. The width Wp is preferably not greater than 1.0 mm. The projection 36 having a width Wp of not greater than 1.0 mm has reduced influence on the appearance. The tire 2 maintains excellent appearance. From this viewpoint, the width Wp is more preferably not greater than 0.8 mm. The width Wp is preferably not less than 0.5 mm. Air can more effectively gather in the recessed portion 46, of the side cavity surface 42, corresponding to the projection 36 having a width Wp of not less than 0.5 mm. By providing the vent hole 48, a saw cut, a vent piece, or the like is provided at the position of the recessed portion 46, remaining of air can be effectively prevented. In the tire 2, occurrence of bareness at the side portion 26 can be suppressed. From this viewpoint, the width Wp is more preferably not less than 0.6 mm.

In FIG. 2, reference character P represents a position on the outer surface of the tire 2. At this position, the tire 2 has a maximum width. The position P is a maximum width position. Although not shown, at least one outward bending point 34 is preferably located outward of the maximum width position P in the radial direction. At the radially outer side of the maximum width position P, rubber flow is likely to occur during vulcanization. Thus, remaining of air is likely to occur due to lack of rubber. When the outward bending point is located outward of the maximum width position P in the radial direction and the vent hole 48, a saw cut, a vent piece, or the like is provided at the position of the inward bending point 44, of the mold 40, corresponding to the outward bending point, remaining of air can be effectively prevented. In the tire 2, occurrence of bareness at the side portion 26 can be suppressed.

As shown in FIG. 2, in the tire 2, the outward bending point 34 is located near an end 50 of the turned-up portion 22b of the first ply 22 in the radial direction. At least one outward bending point 34 is preferably located near the end 50 of the turned-up portion 22b as described above. Near the end 50 of the turned-up portion 22b, irregularities are easily formed on the side surface 28. At this portion, air is likely to remain. When the outward bending point 34 is located near the end 50 of the turned-up portion 22b and the vent hole 48, a saw cut, a vent piece, or the like is provided at the position of the inward bending point 44, of the mold 40, corresponding to the outward bending point 34, remaining of air can be effectively prevented. In the tire 2, occurrence of bareness at the side portion 26 can be suppressed.

From the viewpoint of locating the outward bending point 34 near the end 50 of the turned-up portion 22b of the carcass ply 20 in the radial direction, the distance in the radial direction between the end 50 of the turned-up portion 22b and the outward bending point 34 is preferably not greater than 5 mm and more preferably not greater than 3 mm.

In the case where the carcass 10 includes a plurality of carcass plies 20 as in the tire 2 in FIG. 2, the outward bending point 34 is more preferably located near the end of the turned-up portion located at the outer side in the axial direction, and the outward bending point 34 is further preferably located near the ends of all the turned-up portions.

As shown in FIG. 2, the tire 2 also includes a projection 36 at the radially inner end 32 of the side surface 28. In the radial direction, the end of the turned-up portion may be located near the inner end 32 of the side surface 28. When the end of the turned-up portion is located near the inner end 32 of the side surface 28 and the vent hole 48, a saw cut, a vent piece, or the like is provided at the position of the recessed portion 46, of the mold 40, corresponding to the projection 36 at the inner end 32, remaining of air can be effectively prevented. In the tire 2, occurrence of bareness at the side portion 26 can be suppressed.

From the viewpoint of locating the end of the turned-up portion near the inner end 32 of the side surface 28 in the radial direction, the distance in the radial direction between the end of the turned-up portion and the inner end 32 of the side surface 28 is preferably not greater than 5 mm and more preferably not greater than 3 mm.

For the tire 2 for a two-wheeled vehicle, near a base 52 of the tread 4 (the edge of a tread rubber) and at the radially inner side of the base 52, rubber flow is likely to occur during vulcanization. Thus, remaining of air is likely to occur due to lack of rubber. Although not shown, in the tire 2 for a two-wheeled vehicle, at least one outward bending point 34 is preferably located near the base 52 of the tread 4 and inward of the base 52 in the radial direction. By providing the vent hole 48, a saw cut, a vent piece, or the like at the position of the inward bending point 44, of the mold 40, corresponding to the outward bending point 34, remaining of air can be effectively prevented. In the tire 2, occurrence of bareness at the side portion 26 can be suppressed.

From the viewpoint of locating the outward bending point 34 near the base 52 of the tread 4 in the radial direction, the distance in the radial direction between the base 52 of the tread 4 and the outward bending point 34 is preferably not greater than 5 mm and more preferably not greater than 3 mm.

In the present invention, the dimensions and the angles of the respective components of the tire 2 are measured in a state where the tire 2 is put in the mold 40.

EXAMPLES

Example 1

A tire for a two-wheeled vehicle of Example 1 having the structure shown in FIG. 1 was obtained. In production of the tire, a vent hole was provided at the position of an inward bending point, of a mold, corresponding to each outward bending point. The size of the tire was 80/100-21. Specifications of the tire are shown in Table 1. In the tire, as shown in FIG. 1, the contour of each side surface includes two outward bending points. This is indicated as "2" in the cell for "Number of bending points" in Table 1. The contour of the side surface includes two continuous straight lines. This is indicated as "2" in the cell for "Number of straight lines" in Table 1. In the tire, the distance DR between the adjacent outward bending points is smaller than 0.2 times the cross-sectional height H. This is indicated as "Yes" in the cell for "Ratio (DR/H)<0.2". As shown in FIG. 1, in the tire, the outward bending point is not present near the base of the tread and is present near the end of the turned-up portion. This is indicated as "No" in the cell for "Tread base" in Table 1 and is indicated as "Yes" in the cell for "Turned-up portion end". In the tire, projections are provided at the positions of all the outward bending points. This is indicated as "Yes" in the cell for "Projection" in Table 1.

Comparative Example 1

A tire of Comparative Example 1 was obtained in the same manner as the tire of Example 1, except the contour of the side surface was formed to include no straight lines and no outward bending points.

Example 2

A tire of Example 2 was obtained in the same manner as the tire of Example 1, except the contour of the side surface was formed to include three continuous straight lines by adding an outward bending point near the base of the tread and forming a straight line between this outward bending point and the outward bending point located inward of this outward bending point.

Example 3

A tire of Example 3 was obtained in the same manner as Example 2, except no projection was provided at the positions of all the outward bending points.

Example 4

A tire of Example 4 was obtained in the same manner as Example 3, except for the following. For the two continuous straight lines located outward and inward of the outward bending point located near the end of the turned-up portion, the outer end of the straight line located at the outer side and the inner end of the straight line located at the inner side were connected to each other, whereby these straight lines were made into one straight line.

Accordingly, no outward bending point was present near the end of the turned-up portion.

Example 5

A tire of Example 5 was obtained in the same manner as Example 1, except the position of the outward bending point located near the end of the turned-up portion was shifted inward in the radial direction such that no outward bending point was present near the end of the turned-up portion, and no projection was provided at the positions of all the outward bending points.

Example 6

A tire of Example 6 was obtained in the same manner as Example 1, except, of the two continuous straight lines, the outer end of the straight line located at the outer side and the inner end of the straight line located at the inner side were connected to each other, whereby these straight lines were made into one straight line.

[Bareness Prevention]

For each of the Examples and Comparative Example, ten tires were produced. The state of occurrence of bareness at each side surface was visually confirmed. The result is indicated in Table 1 as an index with the result of Comparative Example 1 being regarded as 100. The higher the value is, the more occurrence of bareness is suppressed. The higher the value is, the better the result is.

[Ride Comfort]

Each of the tires was fitted to a normal rim (rim size=1.60-21) and mounted to the front wheel of a two-wheeled vehicle. The tire was filed with air such that the internal pressure thereof was 80 kPa. A commercially available tire (size: 80/100-21) was mounted to the rear wheel. The two-wheeled vehicle was caused to run on a leveled ground road surface and an uneven terrain road surface, and a sensory evaluation was made by a rider. The evaluation was made for ride comfort. The result is indicated in Table 1 as an index with the result of Comparative Example 1 being regarded as 100. The higher the value is, the better the ride comfort is. The higher the value is, the better the result is.

TABLE 1

Results of Evaluation

|  | Comp. Ex. 1 | Example 1 | Example 2 | Example 3 | Example 4 | Example 5 | Example 6 |
|---|---|---|---|---|---|---|---|
| Number of bending points | 0 | 2 | 3 | 3 | 2 | 2 | 1 |
| Number of straight lines | 0 | 2 | 3 | 3 | 2 | 2 | 1 |
| Ratio (DR/H) < 0.2 | — | Yes | Yes | Yes | Yes | Yes | No |
| Tread base | No | No | Yes | Yes | Yes | No | No |
| Turned-up portion end | No | Yes | Yes | Yes | No | No | Yes |
| Projection | No | Yes | Yes | No | No | No | Yes |
| Bareness prevention | 100 | 118 | 120 | 115 | 110 | 105 | 103 |
| Ride comfort | 100 | 100 | 100 | 100 | 100 | 100 | 98 |

As shown in Table 1, the tires of the Examples are superior to the tire of the Comparative Example as a whole. From the evaluation results, advantages of the present invention are clear.

The technology described above can also be applied to various tires.

The above descriptions are merely illustrative examples, and various modifications can be made without departing from the principles of the present invention.

What is claimed is:

1. A pneumatic tire, comprising:
a tread including a tread surface;
a carcass;
a pair of beads; and
a contour of an outer surface of each side portion that includes:
a first segment that is a straight line or a circular arc, and
a second segment that is a straight line or a circular arc and that is continuous with the first segment, wherein
the contour of the outer surface of each side portion bends outward with a connection point of the first segment and the second segment as a bending point,
the contour includes more than 2 bending points,
a distance in a radial direction of the tire between the bending points is not greater than 0.2 times a cross-sectional height of the tire for all of adjacent pairs of bending points,
an angle between the first segment and the second segment that opens toward an inside of the tire is an obtuse angle that is not greater than 165°, wherein
the carcass includes a carcass ply extending on and between both of the beads, and
the carcass ply is turned up around each bead of the beads from an inner side toward an outer side to form a main portion and a turned-up portion in the carcass ply, wherein
the contour of the outer surface of the tire on an axially outer side of the bead includes a circular arc that is convex inward in an axial direction, a radially outer end of the circular arc is connected to a radially inner end of the first segment, an inner end of a side surface is the radially inner end of the first segment, and wherein
a distance in the radial direction between an end of the turned-up portion and the inner end of the side surface is not greater than 5 mm, and wherein
a distance in the radial direction between a base of the tread and one of the bending points is not greater than 3 mm.

2. A pneumatic tire, comprising:
a tread including a tread surface; and
a contour of an outer surface of each side portion of the tire that includes:
a first straight segment that is a straight line,
a second straight segment that is a straight line and that is continuous with the first straight segment, and
a third segment, wherein
the contour of the outer surface of each side portion bends outward with a connection point of the first straight segment and the second straight segment as a first bending point,
the contour further includes a second bending point that is a connection point of the third segment and one of the first and second segments,
the first bending point and the second bending point are covered by the tread surface of the tire in a radial direction of the tire,
the contour includes a projection at one or more of the first and second bending points, and the projection is disposed on an outer side of two adjacent segments among the first, second, and third segments,
an angle between the first straight segment and the second straight segment that opens toward an inside of the tire is an obtuse angle that is not greater than 175°, and
a distance in the radial direction between a base of the tread and the second bending point is not greater than 5 mm.

3. A pneumatic tire, comprising:
a tread including a tread surface; and
a contour of an outer surface of each side portion of the tire that includes:

a first segment that is a circular arc,
a second segment that is a circular arc and that is continuous with the first segment, and
a third segment, wherein
the contour of the outer surface of each side portion bends outward with a connection point of the first segment and the second segment as a first bending point,
the contour further includes a second bending point that is a connection point of the third segment and one of the first and second segments,
the first bending point and the second bending point are covered by the tread surface of the tire in a radial direction of the tire,
an angle between the first segment and the second segment that opens toward an inside of the tire is an obtuse angle that is not greater than 165°, and
a distance in the radial direction between a base of the tread and the second bending point is not greater than 5 mm.

4. A pneumatic tire, comprising:
a tread including a tread surface;
a carcass and a pair of beads; and
a contour of an outer surface of each side portion of the tire that includes:
a first segment that is a straight line,
a second segment that is a straight line and that is continuous with the first segment, and
a third segment, wherein
the contour of the outer surface of each side portion bends outward with a connection point of the first segment and the second segment as a first bending point,
the contour further includes a second bending point that is a connection point of the third segment and one of the first and second segments,
the first bending point and the second bending point are covered by the tread surface of the tire in a radial direction of the tire,
an angle between the first segment and the second segment that opens toward an inside of the tire is an obtuse angle that is not greater than 165°,
a distance in the radial direction between a base of the tread and the second bending point is not greater than 5 mm,
the carcass includes a carcass ply extending on and between both of the beads, and
the carcass ply is turned up around each bead of the beads from an inner side toward an outer side to form a main portion and a turned-up portion in the carcass ply, wherein
the contour of the outer surface of the tire on an axially outer side of the bead includes a circular arc that is convex inward in an axial direction, a radially outer end of the circular arc is connected to a radially inner end of the first segment, an inner end of a side surface is the radially inner end of the first segment, and wherein
a distance in the radial direction between an end of the turned-up portion and the inner end of the side surface is not greater than 5 mm.

5. The tire according to claim 4, wherein the second bending point is located at an outermost side and is located outward of a maximum width position of the tire in the radial direction.

6. The tire according to claim 4, wherein
at least the second bending point is located adjacent the base of the tread and inward of the base in the radial direction, and
the tire is a tire for a two-wheeled vehicle.

7. The tire according to claim 4, wherein
the contour includes more than 2 bending points, and
a distance in the radial direction between the bending points is not greater than 0.2 times a cross-sectional height of the tire for all of adjacent pairs of bending points.

8. The tire according to claim 4, further comprising a carcass and a pair of beads, wherein
the carcass includes a carcass ply extending on and between both beads,
the carcass ply is turned up around each bead from an inner side toward an outer side to form a main portion and a turned-up portion in the carcass ply, and
at least the second bending point is located adjacent an end of the turned-up portion in the radial direction.

9. The tire according to claim 8, wherein a distance in the radial direction between the end of the turned-up portion and at least the second bending point is not greater than 3 mm.

10. The tire according to claim 4, wherein the contour includes a projection at one or more of the first and second bending points.

11. The tire according to claim 10, wherein the projection at one or more of the first and second bending points includes a height that is not less than 0.5 mm and not greater than 1.0 mm.

12. The tire according to claim 10, wherein the projection at one or more of the first and second bending points includes a width that is not less than 0.5 mm and not greater than 1.0 mm.

13. The tire according to claim 1, wherein the contour includes 2 to 15 bending points.

14. The tire according to claim 13, wherein a number of the bending points is not greater than 4.

15. The tire according to claim 13, wherein a distance in the radial direction between the bending points that are adjacent to each other is not greater than 0.2 times a cross-sectional height of the tire.

* * * * *